(12) United States Patent
Martin et al.

(10) Patent No.: US 6,224,214 B1
(45) Date of Patent: May 1, 2001

(54) AUTOSTEREO PROJECTION SYSTEM

(75) Inventors: Graham Martin, Woodland Hills, CA (US); Joseph L. Mclaughlin, Marblehead, MA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/103,955

(22) Filed: Jun. 24, 1998

Related U.S. Application Data

(63) Continuation-in-part of application No. PCT/US98/06304, filed on Mar. 27, 1998, which is a continuation of application No. 09/003,614, filed on Jan. 7, 1998, now Pat. No. 5,993,003

(60) Provisional application No. 60/050,603, filed on Jun. 24, 1997, and provisional application No. 60/042,424, filed on Mar. 27, 1997.

(51) Int. Cl.[7] .............................. G02B 5/32; G02B 27/22
(52) U.S. Cl. ............................................. 353/7; 359/464
(58) Field of Search .................... 353/6, 7, 10; 359/462, 359/463, 464, 472, 475, 478

(56) References Cited

U.S. PATENT DOCUMENTS

| | | | |
|---|---|---|---|
| 4,799,739 | 1/1989 | Newswanger | 350/3.7 |
| 4,853,769 | 8/1989 | Kollin | 359/88 |
| 5,132,839 | 7/1992 | Travis | 359/462 |
| 5,223,925 | 6/1993 | Hattori | 358/88 |
| 5,283,640 | 2/1994 | Tilton | 348/42 |
| 5,392,140 | 2/1995 | Ezra et al. | 359/41 |
| 5,430,474 | 7/1995 | Hines | 348/42 |
| 5,465,175 | 11/1995 | Woodgate et al. | 359/463 |
| 5,495,576 | 2/1996 | Ritchey | 395/125 |
| 5,521,724 | 5/1996 | Shires | 359/22 |
| 5,543,964 * | 8/1996 | Taylor et al. | 359/463 |
| 5,546,120 | 8/1996 | Miller et al. | 348/59 |
| 5,568,314 | 10/1996 | Omori et al. | 359/464 |
| 5,614,941 | 3/1997 | Hines | 348/42 |
| 5,825,540 * | 10/1998 | Gold et al. | 359/462 |
| 5,855,425 * | 1/1999 | Hamagishi | 353/7 |
| 5,993,003 * | 11/1999 | McLaughlin | 353/7 |

FOREIGN PATENT DOCUMENTS

0656555 A1    6/1995  (EP).
0752609 A2    1/1997  (EP).

OTHER PUBLICATIONS

Travis, A.R.L., et al., "The Design and Evaluation of a CRT–Based Autostereoscopic 3–D Display," *Proceedings of the SID*, 32(4):279–283, (1991).
Travis, A.R.L., "Panoramic 3D Video," ICAT 94, Tokyo, pp. 229–235, Jul. 14–15, 1994.
Travis, A.R.L., et al., "Time–Manipulated Three–Dimensional Video," 4 pgs.
Travis, A.R.L., "Autostereoscopic 3–D Display," *Applied Optics*, 29(29):4341–4343, (1990).
Lang, S.R., et al., "A 2nd Generation Autostereoscopic 3–D Display," pp. 1–11.
"NHK Broadcast Technology Lab—New Autostereo System With 4 Views," (English Translation), comprising 3 pages, Jul. 7, 1996.
Hoshino, H., et al., "Multi–Viewpoint 3D Display With Time–Divided Backlighting System," comprising 14 pages.

* cited by examiner

*Primary Examiner*—William Dowling
(74) *Attorney, Agent, or Firm*—Hamilton, Brook, Smith & Reynolds, P.C.

(57) ABSTRACT

An autostereo projection system uses multiple projectors to form an essentially seamless and extended field of view. Each projector is registered to a CRT display. Shutter elements in each projector create multiple pupils for each CRT display. Each CRT display is driven with different images for each shutter pupil. Seamlessness is promoted by the use of a tunable optical diffuser as part of a common lenticular viewing lens.

58 Claims, 3 Drawing Sheets

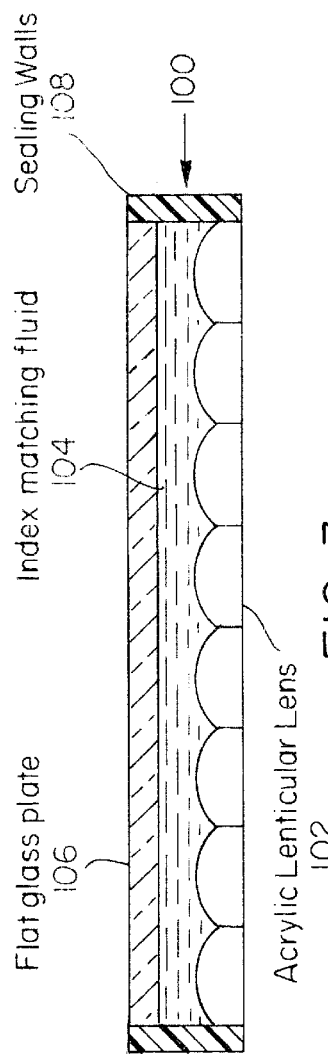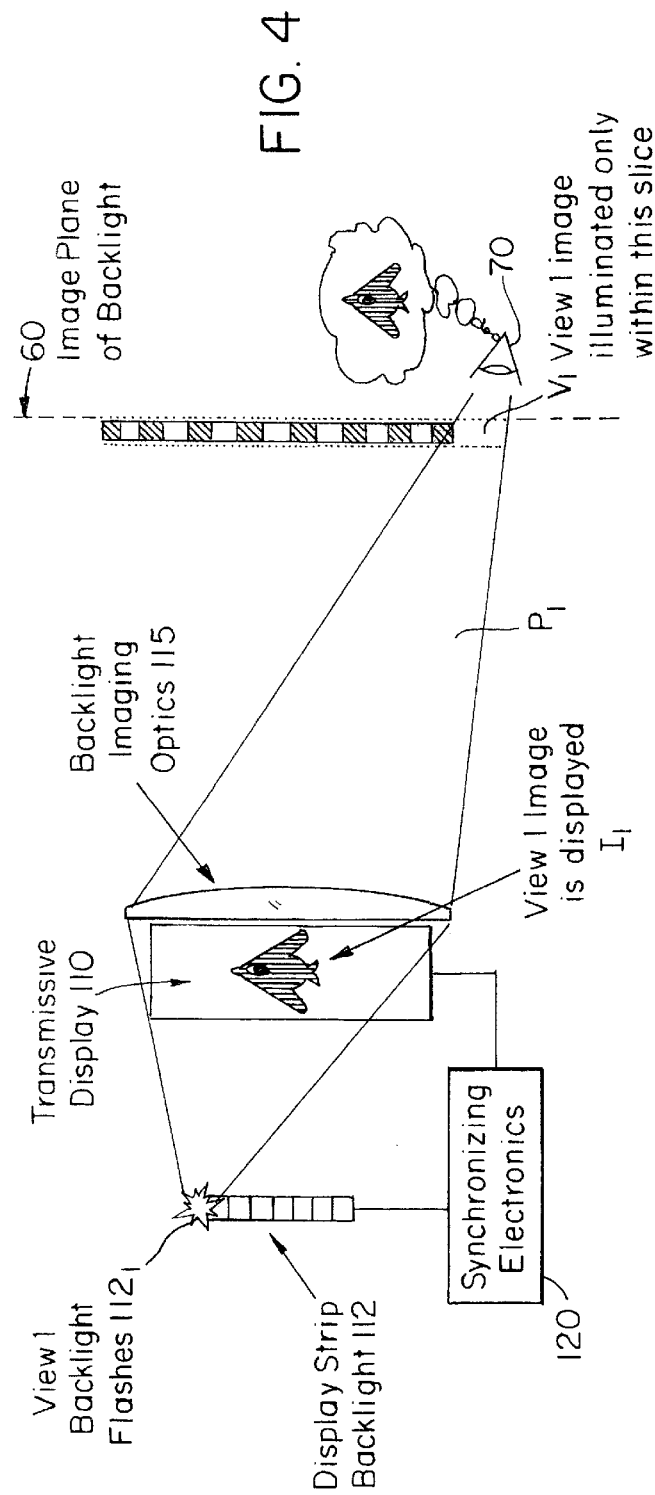

AUTOSTEREO PROJECTION SYSTEM

RELATED APPLICATIONS

This application is a Continuation-in-Part of International Application No. PCT/US98/06304 filed Mar. 27, 1998, which is a continuation to U.S. Ser. No. 09/003,614 filed Jan. 7, 1998, now U.S. Pat. No. 5,993,003 which claims the benefit of U.S. Provisional Application Nos. 60/042,424 filed Mar. 27, 1997, and 60/050,603 filed Jun. 24, 1997, the entire teachings of which are all incorporated herein by reference in their entirety.

BACKGROUND OF THE INVENTION

The world is a three-dimensional (3-D) place and the human brain is very effective at interpreting data when it is presented in a 3-D format. The human brain interprets a scene as being three-dimensional by a variety of visual clues from which it can extract information for depth perception. There have been many attempts to find an effective way of creating displays that take advantage of visual clues to provide a true 3-D window on the world with practical real-time motion.

The visual clues can be broken down to four main categories which may be replicated by a 3-D display technology. Although an individual eye only sees a two dimensional (2-D) image created on the retina, the observer's brain works with the slightly different views from the two eyes to construct the third dimension of depth from which the brain can create a 3-D image. This process is called stereopsis. To achieve this result, a display must somehow channel a different view into each eye.

Another category is motion parallax, which relies on the relative apparent motion of objects in the field of view as the observer's head moves vertically or laterally. To achieve this result, a display typically gauges and responds to the observer's head motion.

The two other categories provide weaker visual clues. Using eye focusing and convergence feedback, the brain can obtain some information about the depth position of an object by sensing how strongly the eye lens is squeezed to bring the object into focus and the relative angles of the two eyes needed to make the object views converge within the brain. Because, eye focusing and convergence are weak visual clues, most 3-D display systems can operate with the observer focusing at a fixed distance, such as infinity or on a screen close to the observer.

In addition, software-based visual illusions can create weak visual clues within an image generator for display on a 2-D surface. These illusions include object perspective and shading, distance haze and movement parallax from camera motion. Software-based visual illusions are the easiest category of visual clues to produce. Indeed, most simulator and computer games produce these visual illusions by using 3-D worlds within the computer memory and processor before rendering on a 2-D surface.

One example of a three-dimensional display taking advantage of stereopsis includes a movable vertical slit in combination with an image source. The slit is moved between a plurality of positions in sequence with images displayed by the image source. The images can be viewed by a viewer with each image displaced in space based on the position of the slit.

An example of a 3-D display device which can provide both stereopsis and motion parallax is a head-mounted display (HMD) device. Miniature display screens within the HMD device are registered to and provide a respective image to each eye. A head tracking device can be combined with the HMD device to provide lookaround capability with observer head motion. Such systems are, however, limited to use by a single observer at any one time and transport delays can result in nausea and loss of equilibrium.

SUMMARY OF THE INVENTION

In most 3-D viewing situations, it is only necessary to provide parallax for motion in a plane occupied by both of the observer's eyes (e.g. a horizontal plane). Although prior art systems can provide a stereoscopic image to an observer, they have a number of significant limitations. Such systems suffer from low image brightness, a narrow field of view, a small number of pupil slices, and a small image size. Although any one of these deficiencies could be improved using prior art techniques, such improvement would be at the expense of severe degradation of the other considerations.

In accordance with preferred embodiments of the invention, a three-dimensional display device includes a multiple pupil, multiple projection system which has its pupils abutted as close together as possible. Each projection system simultaneously images a respective image from an image source onto a common viewing optic. The viewing optic can include a Fresnel lens or a concave mirror in a folded system. The viewing optic images the exit pupil of the projection lenses onto a continuous array of viewing ports at a viewing space. Such a system provides a brighter, multiple view display with a wide viewing space projection.

In accordance with a first aspect of the invention, a display device includes a plurality of image sources and an image space having a plurality of discrete views. Each image source displays a plurality of sequential images of an object. Each view is optically coupled to a respective sequential image of the object.

A multi-projection optical system is preferably used to couple the views to the sequential images. The multi-projector optical system includes a plurality of projector lens assemblies, each registered to a respective image source. A plurality of addressable shutters are registered to each projector lens assembly. A common viewing assembly is registered to the projector lens assemblies to provide the multiple views. The common viewing assembly preferably includes a tunable optical diffuser to smear seams between the projector systems. The optical diffuser preferably includes an index matching medium.

Preferably, a controller is coupled to the image sources and the shutter elements. Each image source provides a respective view of a scene at a specific time. The shutters are arranged such that there are a plurality of slits optically aligned with each image source. The controller operates the image sources and the shutters to form a plurality of simultaneous images. An observer views two of these images at a time, one with each eye.

The above and other features of the invention, including various novel details of construction and combination of parts, will be more particularly described with reference to the accompanying drawings and pointed out in the claims. It will be understood that the particular embodiments of the invention are shown by illustration only and not as a limitation of the invention. The principal and features of this invention may be embodied in varied and numerous embodiments without departing from the scope of the invention.

BRIEF DESCRIPTION OF THE DRAWINGS

FIG. 3 is a schematic diagram of a preferred lenticular sandwich diffuser in accordance with the invention.

FIG. 4 is a schematic diagram of a transparent image generating device employable in accordance with preferred embodiments of the invention.

DETAILED DESCRIPTION OF PREFERRED EMBODIMENTS OF THE INVENTION

Figure 1:
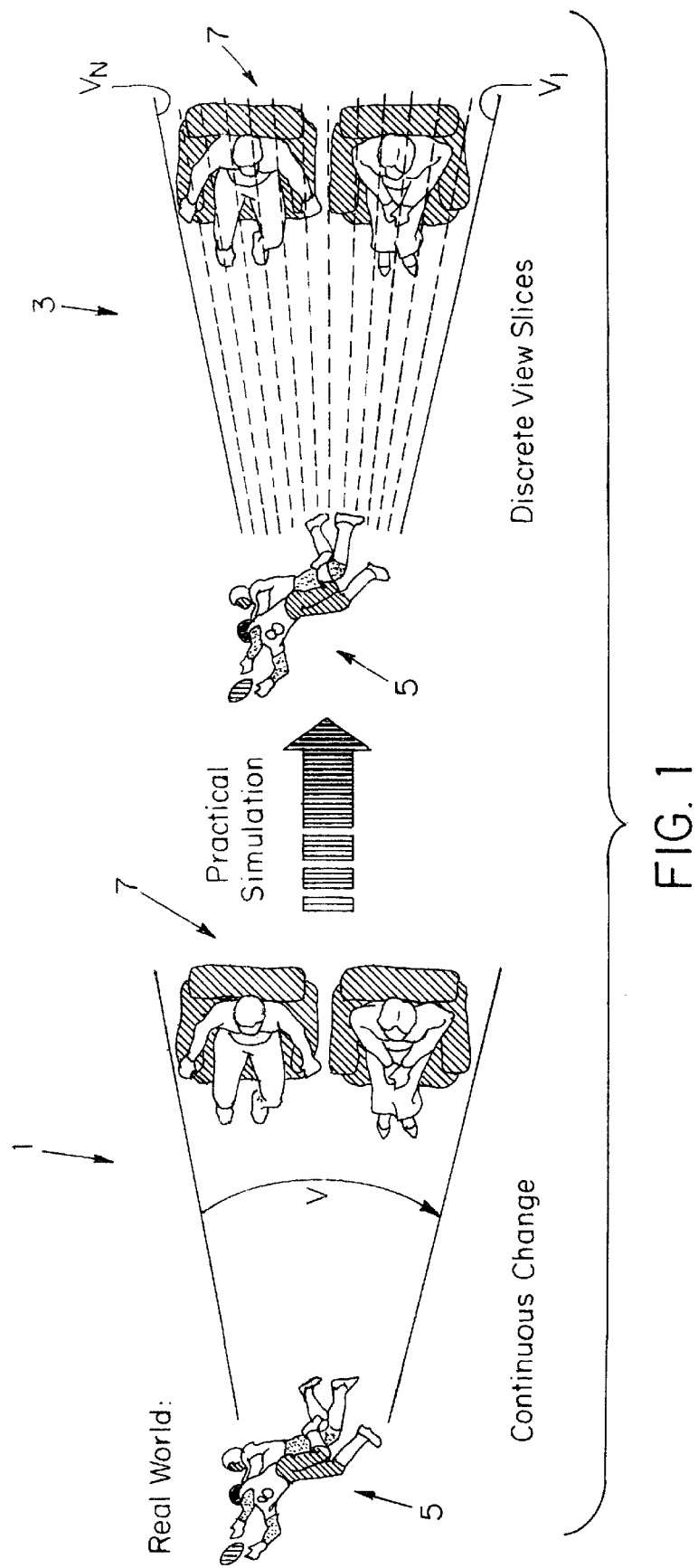
FIG. 1 is a schematic diagram of a simulating 3-D view using discrete parallax changes.

FIG. 1 is a schematic diagram of a simulating 3-D view using discrete parallax changes. In the real world 1, as an observer 7 moves horizontally the viewing angle image of an object 5 changes smoothly and continuously.

In practice, however, the human brain is comfortable with stepped changes as long as the step increments are suitably small. In a practical simulation 3, discrete view slices $V_1, \ldots, V_N$ of the object 5 are provided to the observer 7.

The simplest form of this "quantized" approach is a lenticular raster. Static images from different camera angles are divided into narrow strips and interlaced with one another in an ordered manner. When a lenticular lens of the correct number of lines per unit length, according to the strip width, is laid over the mingled images, observers 7 can see a different complete image, depending on their angle of view.

Spatially multiplexed systems based on a lenticular raster have two main drawbacks. First, because all the images are displayed simultaneously on the image generating device, the area available for each is limited and the image resolution is restricted. Second, each view requires its own optical projection system, making the scheme complex and difficult to scale for more views.

In accordance with preferred embodiments of the invention, time multiplexing is used to avoid the deficiencies found in spatial multiplexing systems. Briefly, the images corresponding to the various viewing angles are flashed on the image generating device sequentially in time, each occupying the full screen.

Figure 2:
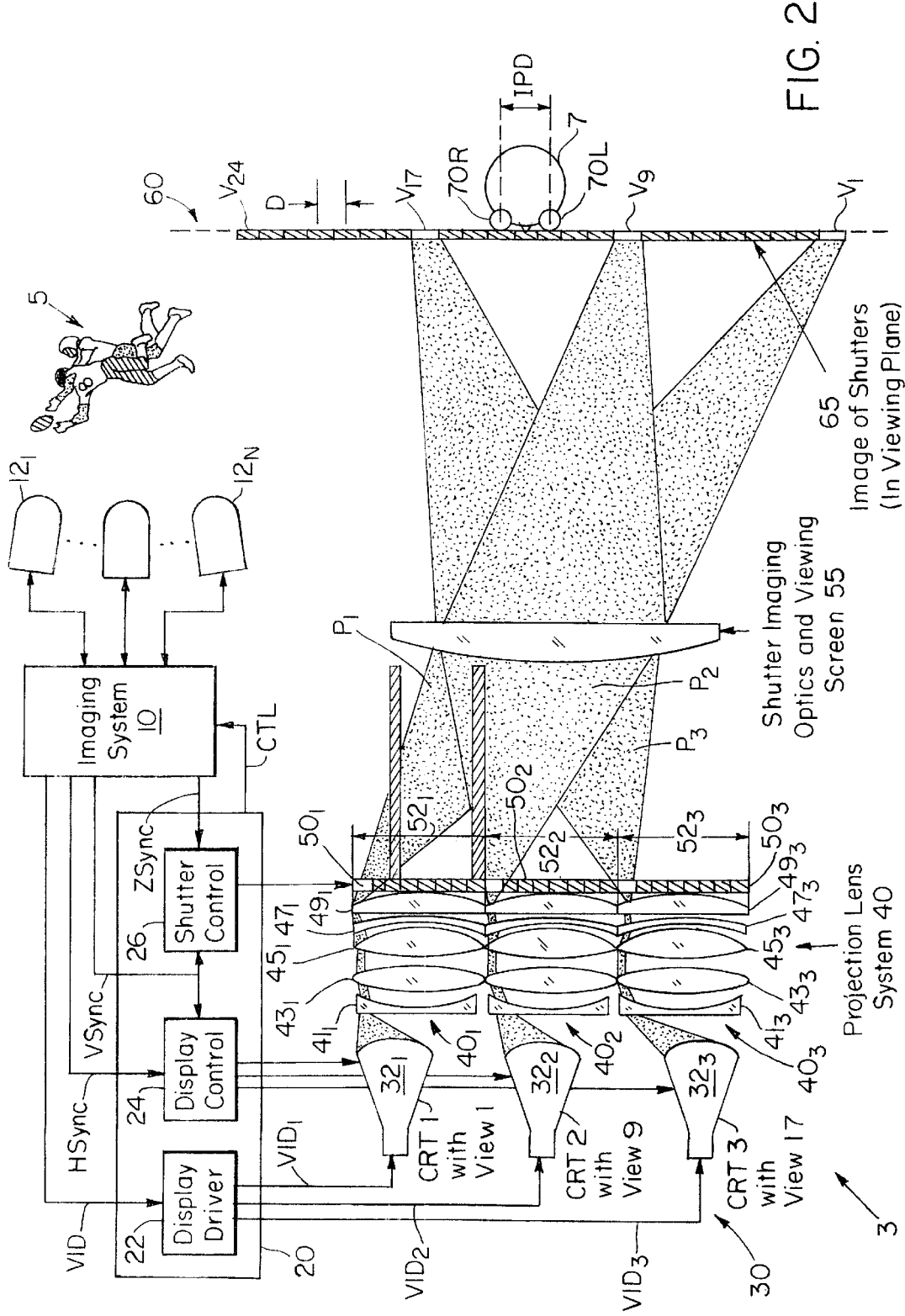
FIG. 2 is a schematic diagram of a preferred autostereoscopic projection system in accordance with a preferred embodiment of the invention.

FIG. 2 is a schematic diagram of a preferred autostereoscopic projection system in accordance with a preferred embodiment of the invention. In one embodiment, views of an object 5 are captured by an array of still or video cameras $12_1, 12_2, \ldots, 12_N$. An imaging system 10 prepares the captured images for display. The images and video synchronization signals are provided to a control system 20 over a video bus VID and synchronization connections HSync, VSync, ZSync. The control system 20 can control operation of the camera $12_1, \ldots, 12_N$ via a control bus CTL to the imaging system 10. In another embodiment, the views are computer generated and stored by the imaging system 10.

The control system 20 provides video signals to an imaging system 30. Preferably, the imaging system 30 comprises an array of image sources $32_1, 32_2, 32_3$ which can be cathode ray tube (CRT) or liquid crystal display devices. Although only three CRTs are illustrated, it will be understood that any number of CRTs can be used, with certain optical constraints, depending on the total number of discrete views desired. The image sources 32 also receive control signals from the control system 20.

A projection lens system 40 is optically coupled to the imaging system 30. In particular, the projection system 40 includes a plurality of projection subsystems $40_1, 40_2, 40_3$ which are each coupled to a respective image source $32_1$, $32_2, 32_3$. Each projection lens subsystem 40 includes a plurality of projection lenses 41, 43, 45, 47, 49. The exit pupils $52_1, 52_2, 52_3$ of the image sources $32_1, 32_2, 32_3$ are defined by the front projection lenses $49_1, 49_2, 49_3$. As illustrated, the front projection lenses $49_2$ directly abut adjacent front projection lenses $49_1, 49_3$. In accordance with a preferred embodiment of the invention the front projection lenses $49_1, 49_2, 49_3$ are fabricated by molding the lenses from a sheet of plastic.

Light from the exit pupils $52_1, 52_2, 52_3$ is processed by respective shutter elements $50_1, 50_2, 50_3$. The shutter elements 50 are spatial light modulators which include a moveable slit controlled by the control system 20. Preferably, the shutter elements 50 are liquid crystal devices and the slit is a vertical light modulating cell which can be selected from about 5–8 vertically arranged positions in each shutter element 50. Alternatively, the light modulating cell can be selected from a plurality of two-dimensionally arranged windows in each shutter element.

Although the shutter elements $50_1, 50_2, 50_3$ are shown to be forward of the exit pupils $52_1, 52_2, 52_3$ that arrangement is not required. Indeed, the shutter elements $50_1, 50_2, 50_3$ can be positioned behind the front projection lenses $49_1, 49_2, 49_3$. Preferably, the shutter elements $50_1, 50_2, 50_3$ are positioned as close as possible to the exit pupils $52_1, 52_2, 52_3$. The further the shutter elements are positioned forward of the exit pupils, more optical efficiency is lost. In a particular embodiment of the invention, the shutter elements are placed less than one inch from the front projection lenses with about one-half inch being preferred.

In operation, the control system 20 controls the image sources 32 and the respective shutter element 50 such that a different video frame is provided on the displays for each slit position in the shutter element. In particular, the video frames are time-multiplexed in step with the shutters. In that way, there are plurality of pupils created for each image source 32.

As shown, a plurality of video signals $VID_1, VID_2, VID_3$ are provided by a display driver 22 of the control system 20 to respective image sources $32_1, 32_2, 32_3$. In addition, horizontal synchronization (HSync), vertical synchronization (VSync), and video field synchronization (ZSync) signals are processed by the control system 20. In particular, a display control module 24 receives the HSync and VSync signals to drive the image sources 32. A shutter control module 26 receives the VSync and ZSync signals and drives the shutter elements 50. The VSync signal is used to synchronize the video frames of the image sources 32 with the slits in the shutter elements 50.

Although not shown, a separate red, green, blue (RGB) filter element can be placed over each image source 32. These color filter elements are preferably used to sequentially create a color video frame from a broad spectrum image generator. The display control module 24 would then operate the color filter elements.

For a particular frame of an image source 32, the projection system 40 projects an image projection $P_1, \ldots, P_9, \ldots, P_{17}, \ldots, P_{24}$ to a common viewing optic 55. In accordance with one aspect of the invention, the viewing optic 55 is a Fresnel lens. The viewing optic 55 focuses each exit pupil onto a virtual exit pupil or viewing port $V_1, \ldots, V_{24}$ on an imaging plane 60. These viewing ports provide a view of the frame image on the image source.

At any one time, the viewing optic 55 provides the views from the selected pupil of each image source 32 to a viewing space 65 for viewing by an observer 7 or a plurality of observers. Each observer 7 typically maintains the left eye 70L and the right eye 70R in the viewing space. The eyes are spaced apart by an intra-pupillary distance (IPD). As shown, there an a plurality of viewing ports $V_1, \ldots, V_{24}$ at the imaging plane 60, each providing a view of a respective video frame of a respective image source. The optics are optimized so the views of the slits at the viewing space 65 abut each adjacent view and are spaced apart by a distance D on center. To promote seamless viewing, where the images appear continuous as the viewer's head moves, the distance D is preferably less than or equal to one-half the IPD. Typically, the slits are between 22–25 mm wide at the observer's eye. As such, blackened areas of the image at the observer are substantially eliminated.

Each eye 70L, 70R thus sees a different image source 32 to create an illusion of three-dimensional objects. In addition to essentially seamless viewing, the optical system 3 provides extended viewing through many viewing ports.

To maximize the field of view, the lens array is as large as practical. For example, in accordance with a preferred embodiment of the invention, the optical system has a focal ratio of f/1 and is dimensioned to be equivalent to a 25-inch diagonal monitor.

To minimize the dimensions of the device, a folded optical system having a concave mirror is preferably utilized for the viewing optics 55. The concave mirror operates as a viewing screen, focusing the light onto the respective viewing ports. By employing mirrors, the optical path can be folded to increase the focal length of the system while maintaining a relatively compact size.

A preferred system includes a ferroelectric directing strip shutter having an electronically-controlled slit that lets light pass through only one segment at a time. The images displayed on the CRT and the switching of the directing shutter segments are synchronized so the appropriate image is channeled to each viewing slice. The projection lens system creates an essentially distortion-free real image at the position of the field lens. The size of this image determines the effective screen size seen by the observer.

The field lens 55, which is generally a Fresnel lens equal in size to the effective screen dimensions, has no effect on the real image of the CRT. Its function is to create a real image of the directing shutter at the optimum viewing plane for the observer. Thus the Fresnel lens determines the size of the region where an observer can see a full-screen 3-D image. For practical systems, the depth of the viewing region may extend several feet beyond the optimum viewing plane.

In a prototype system, a refresh rate of 30 frames per second has been obtained on a 25 inch diagonal screen at a 512×384 pixel resolution in an interlaced mode. The preferred viewing distance is about five feet, so the screen subtends an angle of about 20 degrees. The viewing eyebox for a full-screen 3-D image is about 2 feet wide, several feet deep and can provide 28 different camera angles, which are smoothed together by a weak diffuser.

One characteristic of a preferred display is a multiple-view mode, where different sections of the viewing region can image completely different full-screen animation. This is possible because the view slices need not be limited to displaying a series of slightly different camera angles. For instance the leftmost slices could provide a full-screen 3D view of the overall battle scene in a simulator, while the rightmost slices could be used to zero in on a specific area of the battlefield. This multiple view feature is of particular interest to the entertainment industry since, using one machine, two game players sitting side-by-side are provided with their own 3D full-screen independent perspective of the game. A 50 inch screen version for the arcade game market with two side-by-side viewing boxes, each about a foot wide, can be produced.

There are, however, practical constraints in making the exit pupils of the projection lens systems abut without any gap. A lenticular lens can be used to lengthen the exit pupil unidirectionally and horizontally. A lenticular lens is a flat sheet, usually acrylic plastic, having a series of lines, each being in effect a very narrow cylindrical lens with semicircular profile. A typical lenticular lens may have 50 to 100 lines per inch and functions as a unidirectional diffuser. Such lenses are commonly used as the front screen on a large-screen projection television where the lines are mounted vertically so as to widen laterally the angle of view for the screen. As long as the image from the projection lens system 40 creates a real image on the lenticular lens, the image itself is not diffused by the lens, only the exit pupil. A similar effect is seen when viewing objects through a regular diffuser, such as a piece of frosted glass. Objects far from the glass are completely fogged when viewed through it, but a hand pushed up against the glass is clearly visible on the other side.

As with a projection television system, a lenticular lens can be positioned to produce horizontal stretching and so merge the eyeboxes for the multiple projector system. However, this would destroy the 3D effect by merging together the different camera views. A goal is to provide a very small amount of horizontal smearing; enough to remove the seams and soften the edges of the various views, but not enough to destroy the 3D effect. If the seams are initially minimized by carefully abutting the projector lens systems as close as possible, then typically a unidirectional diffuser with about one tenth of a degree of angular spread is needed. Practical lenticular lenses are made out of acrylic plastic with a refractive index of 1.491 and produce between 20 and 40 degrees of angular diffusion. It may be possible to produce an acrylic lenticular lens with considerably less angular diffusion but currently the tooling needed to produce a lens of that particular design is very expensive and, in a preferred embodiment of the invention, needs the capability to tune the amount of diffusion the lens produces to produce the optimum balance between seam removal and clear 3D imagery.

The difficulty in producing an acrylic lenticular lens with very small angular diffusion arises from the large refractive index difference between the acrylic at 1.491 and the air surrounding the lens at 1.000. The focusing power of a lens depends of the refractive index differential between the lens material and the surrounding medium, usually air.

FIG. 3 is a schematic diagram of a preferred lenticular sandwich diffuser in accordance with the invention. The lenticular sandwich 100 includes an acrylic lenticular lens 102, a sheet of glass 106 and a layer of trapped index matching fluid or other medium 104 pressed up against the lenticular surface of the lens. Sealing walls 108 provide an outer boundary for the fluid 104.

The fluid 104 has an index close to that of the acrylic lens 102 and can be easily changed so as to tune the overall lenticular system to produce the desired optical effect within the 3D display. The amount of diffusion is controlled by the refractive index of the matching fluid 104, available commercially in sets with increments down to 0.004. If the index matching fluid 104 has the same index as the acrylic lenticular lens 102 material then the whole device acts as a transparent plate with no diffusion.

The refractive index of the liquid, nl, can be calculated by the equation:

$$nl = -2 \cdot \left[\tan(da) - \frac{1}{[2[fl[(n-1)(lpi)]]]} \cdot n\right] \cdot (fl)(n-1)(lpi)$$

where
lpi is the number of lines per inch for the lenticular lens;
fl is the focal lengths of the lenticular lens segments;
n is the refractive index of the lenticular lens material (e.g., acrylic=1.491)
da is the desired half angular spread for the lenticular lens This lenticular sandwich has been used in a preferred 3D display system and tuned to reduce the seams to an acceptable level while maintaining good image quality and 3D realism. An additional benefit is that the transition between the seen views $V_1, \ldots, V_{24}$ (FIG. 2) is smoothed to produce a less jerky and much more visually pleasing effects as the observer's head 7 moves from side to side.

Although preferred embodiments of the invention employ CRT image sources, a light valve display device can also be used to practice the invention. An example of such display devices is a liquid crystal display device.

FIG. 4 is a schematic diagram of a transparent image generating device employable in accordance with preferred embodiments of the invention. As illustrated, a strip backlight 112 is separated from a transmissive display imaging surface 110. The images corresponding to the various viewing angles are flashed on the image generating device 110 sequentially in time, each occupying the full screen. A common backlight imaging lens 115 creates an image of the display strip backlight in the observer viewing plane. As illustrated, an image $I_1$ for view 1 ($V_1$) on the image plane 60 is displayed on the transmissive display device 110. As illustrated, the first backlight $112_1$ of the display strip backlight 112 is flashed for projecting the view 1 image ($P_1$). Operation of the backlight 112 and transmissive display 110 are controlled by suitable synchronizing electronics 120.

The transmission display 110 is placed in the plane of the common lens 115 and is unaffected by it. The various views are channeled into the appropriate viewing slice in space by a display backlight arrangement or the use of an electronic shutter scheme as described above. In this configuration, the views can also share a common optical train, reducing complexity and making scaling of the system for more views easier.

Liquid crystal displays are not presently capable of producing the frame rates needed for a time-multiplexed system. Current CRT technology, however, can operate at the faster frame rates preferred for time multiplexing. It will be understood that time-multiplexed systems in accordance with preferred embodiments of the invention can include multiple projections of images generated on transmissive display devices.

EQUIVALENTS

Those skilled in the art will know, or be able to ascertain using no more than routine experimentation, many equivalents to the specific embodiments of the invention described herein. These and all other equivalents are intended to be encompassed by the following claims.

We claim:

1. An apparatus for displaying a three-dimensional view of an object, comprising:
  a plurality of color image sources, each color image source displaying a plurality of sequential images of an object;
  a viewing space having a plurality of discrete views and providing extended viewing of the color image sources to a plurality of viewers, each view optically coupled to a respective sequential image of the object; and
  an optical diffuser optically disposed between the color image sources and the viewing space to blur the boundaries between adjacent views and providing essentially seamless viewing of the color image sources as a viewer moves from a first position to a second position in the viewing space, the optical diffuser including at least one of the following: a lenticular lens or tunable optical diffuser;
  a plurality of spatial light modulators, each spatial light modulator comprising a plurality of light modulating cells and coupled to a respective color image source; and
  a control unit coupled to each color image source and each spatial light modulator, the control unit operating the light modulating cells in sequence with the sequential images.

2. The apparatus according to claim 1, wherein said optical diffuser blurs the boundaries between adjacent views in the absence of a holographic optical element.

3. The apparatus according to claim 1, wherein said plurality of color image sources compose a single source displaying images in a time-multiplexed manner.

4. An apparatus for displaying a three-dimensional view of an object, comprising:
  a plurality of color image sources, each color image source displaying a selected video frame at a selected time;
  an optical diffuser registered to the color image sources, the optical diffuser including at least one of the following: a lenticular lens, a tunable optical diffuser, or an index matching medium; and
  a multi-projector optical system optically disposed between the color image sources and the optical diffuser for projecting light from each selected video frame of each color image source through the optical diffuser to a respective viewing position in a viewing space having a two-dimensional array of viewing positions, the optical system comprising:
    a plurality of projector lens assemblies, each projector lens assembly registered to a respective color image source; and
    a plurality of addressable shutters having color filter elements registered to each projector lens assembly.

5. The apparatus according to claim 4, wherein said optical diffuser blurs the boundaries between adjacent views in the absence of a holographic optical element.

6. The apparatus according to claim 4, wherein said plurality of color image sources compose a single source displaying images in a time-multiplexed manner.

7. A method for displaying a three-dimensional view of an object, comprising:
  on each of a plurality of color image sources, displaying a plurality of sequential images of an object;
  optically coupling a viewing space having a plurality of discrete views to a respective sequential image of the object; and
  blurring the boundaries between adjacent views using an optical diffuser optically disposed between the color image sources and the image space;
  coupling a spatial light modulator comprising a plurality of light modulating cells to a respective color image source;

operating the light modulating cells in sequence with the sequential images;

from each color image source, displaying a selected video frame at a selected time;

from a multi-projector optical system, projecting light from each selected video frame of each color image source through the optical diffuser to a respective view in the viewing space; and tuning the optical diffuser using an index matching medium.

8. The method according to claim 7, wherein blurring the boundaries between adjacent views is done in the absence of a holographic optical element.

9. The method according to claim 7, wherein displaying a plurality of sequential images of an object is done in a time-multiplexed manner.

10. An apparatus for displaying a three-dimensional view of an object, comprising:
a plurality of image sources, each image source displaying a plurality of sequential images of an object;
a viewing space having a plurality of discrete views, each view optically coupled to a respective sequential image of the object; and
an optical diffuser optically disposed between the image sources and the viewing space to blur the boundaries between adjacent views, the optical diffuser including a tunable optical diffuser.

11. The apparatus according to claim 10, wherein said optical diffuser blurs the boundaries between adjacent views in the absence of a holographic optical element.

12. The apparatus according to claim 10, wherein said plurality of color image sources compose a single source displaying images in a time-multiplexed manner.

13. The apparatus of claim 10 further comprising a plurality of spatial light modulators, each spatial light modulator comprising a plurality of light modulating cells and coupled to a respective image source.

14. The apparatus of claim 13 further comprising a control unit coupled to each image source and each spatial light modulator, the control unit operating the light modulating cells in sequence with the sequential images.

15. The apparatus of claim 10 wherein the optical diffuser includes a lenticular lens.

16. The apparatus of claim 10 wherein the viewing space provides extended viewing of the image sources to a plurality of viewers.

17. The apparatus of claim 10 wherein the optical diffuser provides essentially seamless viewing of the image sources as a viewer moves from a first position to a second position in the viewing space.

18. An apparatus for displaying a three-dimensional view of an object, comprising:
a plurality of image sources, each image source displaying a selected video frame at a selected time;
an optical diffuser registered to the image sources; and
a multi-projector optical system optically disposed between the image sources and the optical diffuser for projecting light from each selected video frame of each image source through the optical diffuser to a respective viewing position in a viewing space, the optical system comprising:
a plurality of projector lens assemblies, each projector lens assembly registered to a respective image source; and
a plurality of addressable shutters registered to each projector lens assembly.

19. The apparatus according to claim 18, wherein said optical diffuser blurs the boundaries between adjacent views in the absence of a holographic optical element.

20. The apparatus according to claim 18, wherein said plurality of color image sources compose a single source displaying images in a time-multiplexed manner.

21. The apparatus of claim 18 wherein the optical diffuser includes a lenticular lens.

22. The apparatus of claim 18 wherein the optical diffuser includes a tunable optical diffuser.

23. The apparatus of claim 18 wherein the optical diffuser includes an index matching medium.

24. The apparatus of claim 18 further comprising a mirror.

25. The apparatus of claim 18 wherein the addressable shutters include color filter elements.

26. The apparatus of claim 18 wherein the viewing space includes a two-dimensional array of viewing positions.

27. An apparatus for displaying a three-dimensional view of an object, comprising:
a plurality of image sources, each image source displaying a selected video frame at a selected time;
an optical diffuser registered to the image sources, the optical diffuser including a tunable optical diffuser; and
a multi-projector optical system optically disposed between the image sources and the optical diffuser for projecting light from each selected video frame of each image source through the optical diffuser to a respective viewing position in a viewing space.

28. The apparatus according to claim 27, wherein said optical diffuser blurs the boundaries between adjacent views in the absence of a holographic optical element.

29. The apparatus according to claim 27, wherein said plurality of color image sources compose a single source displaying images in a time-multiplexed manner.

30. The apparatus of claim 27 wherein the optical system comprises:
a plurality of projector lens assemblies, each projector lens assembly registered to a respective image source; and
a plurality of addressable shutters registered to each projector lens assembly.

31. The apparatus of claim 27 wherein the optical diffuser includes a lenticular lens.

32. The apparatus of claim 27 wherein the optical diffuser includes an index matching medium.

33. The apparatus of claim 27 further comprising a mirror.

34. The apparatus of claim 27 wherein the addressable shutters include color filter elements.

35. The apparatus of claim 27 wherein the viewing space includes a two-dimensional array of viewing positions.

36. An apparatus for displaying a three-dimensional view of an object, comprising:
a plurality of image sources, each image source displaying a selected video frame at a selected time;
an optical diffuser registered to the image sources, the optical diffuser including an index matching medium; and
a multi-projector optical system optically disposed between the image sources and the optical diffuser for projecting light from each selected video frame of each image source through the optical diffuser to a respective viewing position in a viewing space.

37. The apparatus according to claim 36, wherein said optical diffuser blurs the boundaries between adjacent views in the absence of a holographic optical element.

38. The apparatus according to claim 36, wherein said plurality of color image sources compose a single source displaying images in a time-multiplexed manner.

39. The apparatus of claim 36 wherein the optical system comprises:
- a plurality of projector lens assemblies, each projector lens assembly registered to a respective image source; and
- a plurality of addressable shutters registered to each projector lens assembly.

40. The apparatus of claim 36 wherein the optical diffuser includes a lenticular lens.

41. The apparatus of claim 36 wherein the optical diffuser includes a tunable optical diffuser.

42. The apparatus of claim 36 further comprising a mirror.

43. The apparatus of claim 36 wherein the addressable shutters include color filter elements.

44. The apparatus of claim 36 wherein the viewing space includes a two-dimensional array of viewing positions.

45. An apparatus for displaying a three-dimensional view of an object, comprising:
- a plurality of image sources, each image source displaying a selected video frame at a selected time;
- an optical diffuser registered to the image sources; and
- a multi-projector optical system optically disposed between the image sources and the optical diffuser for projecting light from each selected video frame of each image source through the optical diffuser to a respective viewing position in a viewing space, the optical system comprising:
  - a plurality of projector lens assemblies, each projector lens assembly registered to a respective image source; and
  - a plurality of addressable shutters registered to each projector lens assembly, the addressable shutters including color filter elements.

46. The apparatus according to claim 45, wherein said optical diffuser blurs the boundaries between adjacent views in the absence of a holographic optical element.

47. The apparatus according to claim 45, wherein said plurality of color image sources compose a single source displaying images in a time-multiplexed manner.

48. The apparatus of claim 45 wherein the optical diffuser includes a lenticular lens.

49. The apparatus of claim 45 wherein the optical diffuser includes a tunable optical diffuser.

50. The apparatus of claim 45 wherein the optical diffuser includes an index matching medium.

51. The apparatus of claim 45 further comprising a mirror.

52. The apparatus of claim 45 wherein the viewing space includes a two-dimensional array of viewing positions.

53. A method for displaying a three-dimensional view of an object, comprising:
- on each of a plurality of image sources, displaying a plurality of sequential images of an object;
- optically coupling a viewing space having a plurality of discrete views to a respective sequential image of the object;
- blurring the boundaries between adjacent views using an optical diffuser optically disposed between the image sources and the image space; and
- tuning the optical diffuser using an index matching medium.

54. The method according to claim 53, wherein blurring the boundaries between adjacent views is done in the absence of a holographic optical element.

55. The method according to claim 53, wherein displaying a plurality of sequential images of an object is done in a time-multiplexed manner.

56. The method of claim 53 further comprising coupling a spatial light modulator comprising a plurality of light modulating cells to a respective image source.

57. The method of claim 53 further comprising operating the light modulating cells in sequence with the sequential images.

58. The method of claim 53 further comprising:
- from each image source, displaying a selected video frame at a selected time; and
- from a multi-projector optical system, projecting light from each selected video frame of each image source through the optical diffuser to a respective view in the viewing space.

* * * * *